United States Patent [19]

Maillard

[11] 3,721,675
[45] March 20, 1973

[54] OXAZOLIDIN-2-ONE DERIVATIVES

[75] Inventor: Jacques G. Maillard, Paris, France

[73] Assignee: Laboratoires Jacques Logeais, Issy-les-Moulineaux, France

[22] Filed: March 19, 1970

[21] Appl. No.: 21,188

[30] Foreign Application Priority Data

March 25, 1969 France..................6908662

[52] U.S. Cl. ...260/293.62, 260/293.52, 260/293.66, 424/267
[51] Int. Cl. .............................C07d 99/04
[58] Field of Search ..................260/294.3 B, 293.62

[56] References Cited

UNITED STATES PATENTS 3,399,192   8/1968   Regnier et al. ...................260/240

OTHER PUBLICATIONS

Cram et al., "Organic Chemistry, 2nd Ed.," McGraw-Hill, New York, N.Y. (1964), pp. 376, 377 and 560.

Primary Examiner—John D. Randolph
Assistant Examiner—G. Thomas Todd
Attorney—Roberts, Cushman & Grover

[57] ABSTRACT

The 5-(piperidine-4-spiro)-oxazolidin-2-one derivatives of formula:

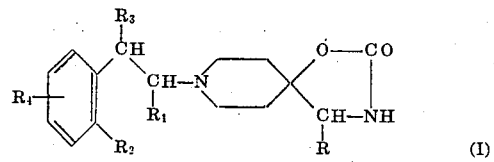

in which R is hydrogen, an alkyl radical or an aryl radical, $R_1$ is an alkyl radical and $R_2$ is hydrogen, or $R_1$ and $R_2$ form together a methylene or ethylene bridge, $R_3$ is hydrogen or an alkyl radical and $R_4$ is hydrogen, halogen, an alkoxy radical or a hydroxy radical, R, $R_2$ and $R_4$ not being simultaneously hydrogen, have analgesic and hypotensive properties.

12 Claims, No Drawings

OXAZOLIDIN-2-ONE DERIVATIVES

This invention relates to new oxazolidin-2-one derivatives, to a process for their preparation and to their applications, particularly in therapeutics.

More particularly, the invention is concerned with 5-(piperidine-4-spiro)-oxazolidin-2-one derivatives of formula:

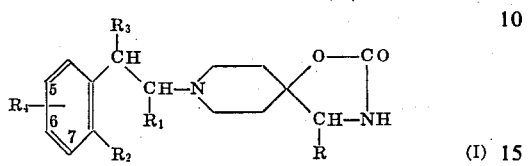

(I)

in which R is hydrogen, or an alkyl or aryl radical, $R_1$ is an alkyl radical and $R_2$ is hydrogen or else $R_1$ and $R_2$ form together a methylene or ethylene bridge, $R_3$ is hydrogen or an alkyl radical and $R_4$ is hydrogen, halogen, an alkoxy radical or a hydroxy radical, R, $R_2$ and $R_4$ not being simultaneously hydrogen, and their acid addition salts.

In the above definition, the alkyl radicals and the alkyl moieties of the alkoxy radicals are preferably lower radicals, having in particular one to six carbon atoms.

When $R_4$ is halogen, it is advantageously chlorine, bromine or fluorine, particularly chlorine.

Among the salts of derivatives (I) are included the addition salts formed with hydrochloric, hydrobromic, maleic, lactic, tartaric acids, and the like.

These new derivatives exhibit pharmacological properties that make them therapeutically useful.

The derivatives in which $R_1$ and $R_2$ form together an ethylene bridge were found particularly interesting, however, those having a methylene bridge and those branched phenylaklyl side-chain are also active.

The invention relates also to the therapeutical application of such new derivatives, particularly as analgesic and hypotensive drugs, in the form of a composition comprising the active compound together with a pharmaceutically administrable vehicle.

The new derivatives according to the invention may be prepared by condensing a ketone of formula:

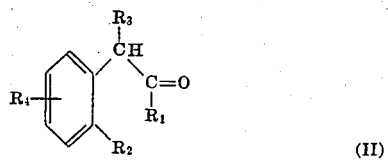

(II)

with a (piperidine-4-spiro)-oxazolidinone of formula:

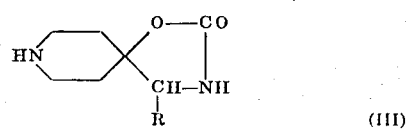

(III)

R, $R_1$, $R_2$, $R_3$ and $R_4$ having the above defined meanings, and reducing the resulting condensation product.

The process for the preparation of compounds (I) according to the invention is illustrated by the following reaction sequence:

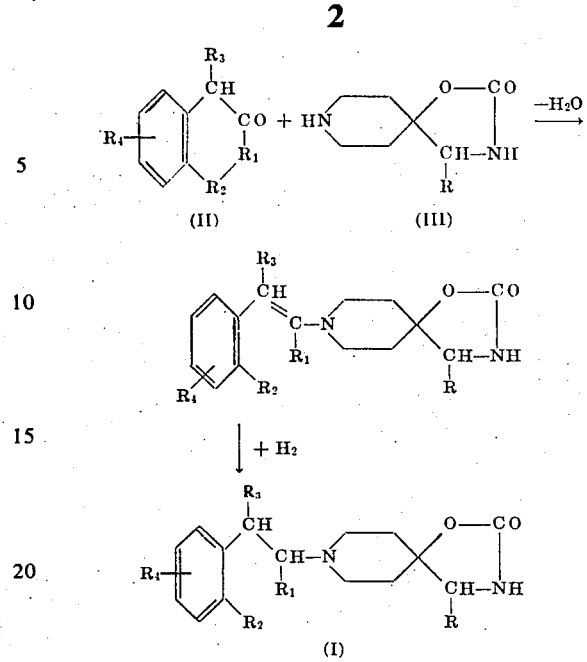

Generally, condensation is carried out in an anhydrous solvent, preferably in the presence of an acid, such as acetic acid or p-toluene sulfonic acid, by heating to the boil under conditions such that the water released may evaporate. Condensation may be conducted under reduced pressure or the water may be removed as an azeotropic mixture.

Advantageously, reduction of the enamine obtained as condensation product is conducted catalytically, particularly in the presence of palladium-over-charcoal, or using an alkali metal borohydride or by any other method suitable for enamine reduction.

Radical $R_4$ may exist as such in the formula of Ketone II or, particularly when it is a hydroxy radical, under blocked form, for example as an alkoxy radical.

The following examples are given to illustrate the invention.

EXAMPLE 1

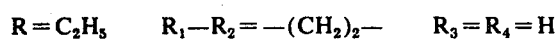

$R = C_2H_5$    $R_1—R_2 = —(CH_2)_2—$    $R_3 = R_4 = H$ 5-(1,2,3,4-tetrahydro-naphthalene-2: 1-piperidine-4-spiro)-4-ethyl-oxazolidin-2-one.

2-Tetralone (11.1 g; 0.069 mole) and 4-ethyl-5-(piperidine-4-spiro)-oxazolidin-2-one (6.8 g; 0.040 mole) are dissolved in xylene (200 ml) and boiled during 16 hours while removing the water formed. After evaporating the xylene, the residue is dissolved in ethanol (400 ml) and is then hydrogenated in the presence of 5 percent palladium-over-charcoal, at normal pressure and at 50°C, during 8 hours. After filtration of the catalyst, which is washed with hot acetic acid, the solvents are evaporated to dryness and the residue is taken up into a 2N ether-HCl mixture. The acidic aqueous phase is extracted twice with ether and is then made alkaline. The precipitate is then redissolved with normal HCl, decolorized over charcoal, precipitated again by alkalinization, dried and then purified by dissolution in benzene and evaporation of the solvent to give 6 g of the desired derivative. Yield: 48 percent. M.p.= 200°C (instantaneous)

Analysis: $C_{19}H_{26}N_2O_2$

| % | Calculated | Found |
|---|---|---|
| C | 72.58 | 73.04 |
| H | 8.33 | 7.80 |

N    8.91    8.85

EXAMPLE 2

$R = C_2H_5$    $R_1—R_2 = —CH_2—$    $R_3 = R_4 = H$ 5-(2,3-dihydro- indene-2 : 1-piperidine-4-spiro)-4-ethyl-oxazolidin-2-one.

This derivative is prepared as described in example 1, by heating 2-indanone and 4-ethyl-5-(piperidine-4-spiro)-oxazolidin-2-one in toluene, followed by catalytic hydrogenation. The product is recrystallized from methanol. Yield: 70 percent. M.p. 254°C (instantaneous).

Analysis: $C_{18}H_{23}N_2O_2$

| % | Calculated | Found |
|---|---|---|
| C | 72.20 | 72.10 |
| H | 7.74 | 8.43 |
| N | 9.36 | 9.33 |

EXAMPLE 3

$R = H$    $R_1—R_2 = —(CH_2)_2—$    $R_3 = R_4 = H$ 5-(1,2,3,4-tetrahydro-naphthalene-2:1-piperidine-4-spiro)-oxazolidin-2-one This derivative is prepared as described in example 1, by heating 2-tetralone and 5-(piperidine-4-spiro)-oxazolidin-2-one in toluene, in the presence of a small amount of p-toluene sulfonic acid, followed by catalytic hydrogenation. The product is recrystallized from isopropanol. M.p. 211°C (instantaneous).

Analysis: $C_{17}H_{22}N_2O_2$

| % | Calculated | Found |
|---|---|---|
| C | 71.29 | 71.43 |
| H | 7.74 | 7.89 |
| N | 9.78 | 9.98 |

EXAMPLE 4

$R = C_6H_5$    $R_1—R_2 = —(CH_2)_2—$    $R_3 = R_4 = H$ 5-(1,2,3,4-tetrahydro-naphthalene-2:1-piperidine-4-spiro)-4-phenyl-oxazolidin-2-one This derivative is prepared as described in example 1, by heating 2-tetralone and 4-phenyl-5-piperidine-4-spiro)-oxazolidin-2-one in toluene, in the presence of a small amount of acetic acid, followed by catalytic hydrogenation. The product is crystallized from isopropanol. M.p.= 212°C (instantaneous).

Analysis: $C_{23}H_{26}N_2O_2$

| % | Calculated | Found |
|---|---|---|
| C | 76.21 | 76.02 |
| H | 7.23 | 7.54 |
| N | 7.73 | 7.70 |

EXAMPLE 5

$R_1 = C_2H_5$    $R_1 = CH_3$    $R_2 = R_3 = R_4 = H$ 5-(phenyl-1-isopropyl-piperidine-4-spiro)-4-ethyl-oxazolidin-2-one.

This derivative is prepared as described in example 1, by heating phenylacetone and 4-ethyl-5-(piperidine-4-spiro)-oxazolidin-2-one in toluene, in the presence of a small amount of toluene sulfonic acid, followed by catalytic hydrogenation.

The product is recrystallized from dilute methanol, and then from ethyl acetate. M.p. = 174°C (instantaneous).

Analysis: $C_{18}H_{27}N_2O_2$

| % | Calculated | Found |
|---|---|---|
| C | 71.48 | 71.80 |
| H | 8.67 | 8.97 |
| N | 9.26 | 9.36 |

EXAMPLE 6

$R = CH_3$    $R_1—R_2 = —(CH_2)_2—$    $R_3 = R_4 = H$

M.p. = 185–187°C (instantaneous)
Analysis:

| % | Calculated | Found |
|---|---|---|
| C | 71.97 | 71.88 |
| H | 8.05 | 8.12 |
| N | 9.33 | 9.28 |

EXAMPLE 7

$R = C_2H_5$    $R_1—R_2 = (CH_2)_2$    $R_3 = H$    $R_4 = OCH_3$ at 7-position M.p. 194°C
Analysis

| % | Calculated | Found |
|---|---|---|
| C | 69.74 | 69.7 |
| H | 8.19 | 8.0 |
| N | 8.13 | 8.0 |

EXAMPLE 8

$R = C_2H_5$    $R_1—R_2 = (CH_2)_2$    $R_3 = H$    $R_4 = OC_2H_5$ at 7-position M.p. 165–166°C
Analysis

| % | Calculated | Found |
|---|---|---|
| C | 70.55 | 70.3 |
| H | 8.18 | 8.7 |
| N | 7.84 | 8.0 |

EXAMPLE 9

$R = C_2H_5$    $R_1—R_2 = (CH_2)_2$    $R_3 = H$    $R_4 = OCH_3$ at 5-position M.p.= 238°C
Analysis

| % | Calculated | Found |
|---|---|---|
| C | 69.74 | 69.7 |
| H | 8.19 | 8.5 |
| N | 8.13 | 8.2 |

EXAMPLE 10

$R = C_2H_5$    $R_1—R_2 = (CH_2)_2$    $R_3 = H$    $R_4 = Cl$ at 6-position

M.p. 176°C.
Analysis:

| % | Calculated | Found |
|---|---|---|
| C | 65.4 | 65.2 |
| H | 7.22 | 7.6 |
| N | 8.03 | 8.1 |
| Cl | 10.16 | 10.6 |

EXAMPLE 11

$R = C_2H_5$    $R_1—R_2 = (CH_2)_2$    $R_3 = H$    $R_4 = OH$ at 7-position 6.5 g (18.9 millimoles) of the derivative described in Example 7 and 25 ml of 48 percent hydrobromic acid are heated to boiling in a closed vessel until a pressure corresponding to the theoretical amount of $BrCH_3$ formed is obtained. The hydrobromic acid is then distilled to dryness under reduced pressure; the residue is dissolved in boiling water and made neutral at pH 7.3. The precipitate is converted to the hydrochloride, dissolved by boiling in the minimum amount of water and crystallized on cooling. The resulting hydrochloride is purified by boiling with 20 ml ethanol and is then converted to a base at pH 7.3 in hot aqueous solution, after which is it suction filtered and dried. M.p. 210°C.
Analysis:

| % | Calculated | Found |
|---|---|---|
| C | 69.06 | 69.0 |
| H | 7.93 | 8.1 |
| N | 8.48 | 8.4 |

EXAMPLE 12

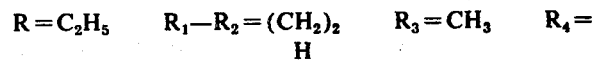

$R = C_2H_5$   $R_1-R_2 = (CH_2)_2$   $R_3 = CH_3$   $R_4 = H$

M.p. = 185°C
Analysis:

| % | Calculated | Found |
|---|---|---|
| C | 73.13 | 73.0 |
| H | 8.59 | 8.7 |
| N | 8.53 | 8.65 |

EXAMPLE 13

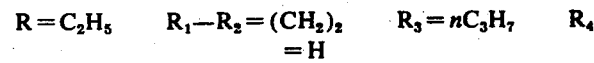

$R = C_2H_5$   $R_1-R_2 = (CH_2)_2$   $R_3 = nC_3H_7$   $R_4 = H$

M.p. = 167°C
Analysis:

| % | Calculated | Found |
|---|---|---|
| C | 74.11 | 73.8 |
| H | 9.05 | 9.2 |
| N | 7.86 | 7.8 |

EXAMPLE 14

$R = H$   $R_1-R_2 = CH_2$   $R_3 = nC_3H_7$   $R_4 = H$

M.p. = 168°C
Analysis:

| ti % | Calculated | Found |
|---|---|---|
| C | 72.81 | 72.71 |
| H | 8.04 | 8.57 |
| N | 8.94 | 9.15 |

EXAMPLE 15

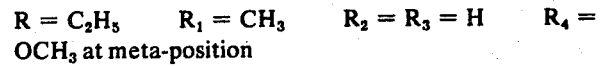

$R = C_2H_5$   $R_1 = CH_3$   $R_2 = R_3 = H$   $R_4 =$ OCH$_3$ at meta-position
M.p. = 117-119°C
Analysis:

| % | Calculated | Found |
|---|---|---|
| C | 68.64 | 69.3 |
| H | 8.49 | 8.8 |
| N | 8.43 | 8.2 |

EXAMPLE 16

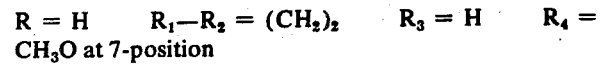

$R = H$   $R_1-R_2 = (CH_2)_2$   $R_3 = H$   $R_4 =$ CH$_3$O at 7-position
M.p. = 173-175°C
Analysis:

| % | Calculated | Found |
|---|---|---|
| C | 68.34 | 68.60 |
| H | 7.65 | 7.81 |
| N | 8.86 | 8.84 |

EXAMPLE 17

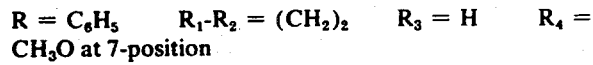

$R = C_6H_5$   $R_1-R_2 = (CH_2)_2$   $R_3 = H$   $R_4 =$ CH$_3$O at 7-position
M.p. = 188-192°C
Analysis:

| % | Calculated | Found |
|---|---|---|
| C | 74.97 | 74.78 |
| H | 7.33 | 7.35 |
| N | 7.29 | 7.16 |

Data obtained from pharmacological tests demonstrating the efficiency of the derivatives according to the invention are given below.

The derivatives prepared in examples 1 and 2 are given orally to mice in which pain contractions are induced by intraperitoneal injection of acetic acid (test conducted according to the operating schedule described by E. Koster, M. Anderson in Fed. Proceed. 1959, 18, page 412). They reduce the number of pain-induced contractions, as set forth in the following table:

| Amount of derivative from Example 1 mg/kg | Protection % | Amount of derivative from example 2 mg/kg | Protection % |
|---|---|---|---|
| 10 | 50 – 60 | 25 | 44 |
| 20 | 68 | 50 | 88 |
| 30 | 77 – 90 | | |

The derivative from example 1 reduces the sensation of thermal pain in mice placed on a metal plate heated at 55°C (test of Eddy, Jacob and Blozowski, Arch. Int. Pharmac. 1961, 133, page 296). On intraperitoneal administration at the rate of 30 mg/kg it provides 51 percent protection. The derivative of example 2, administered at the same dosage, provides 36 percent protection.

Other results of experiments carried out on mice, according to the methods of Koster and Eddy, are given in Table I below.

TABLE I

| Product from example No. | Koster's test Dosage providing 50% protection | Eddy's test Dosage providing 50% protection |
|---|---|---|
| 7 | 45 mg/kg, per os | 15 mg/kg I.P. |
| 8 | — | 25 " |
| 9 | 80 mg/kg per os | 50 " |
| 10 | 25 " | 15 " |
| 11 | 270 " | 300 " |
| 12 | 130 " | — |
| 13 | 100 " | 20 mg/kg I.P. |

In addition to their analgesic properties demonstrated above, the derivatives according to the invention have adrenolytic and hypotensive properties. Thus, the derivative from example 1 suppresses or reverses the hypertensive and vasoconstrictive action of adrenalin in rabbit, cat and dog at a dosage of 250 μg per kg on intravenous administration or of 5 mg/kg by the intraduodenal route.

Similarly, Table II below reports the results of similar tests conducted with other derivatives of formula (I).

TABLE II

| Product from Example No. | Adrenolytic action in dog active dosage |
|---|---|
| 7 | 20 mg/kg I.D. |
| 8 | 10 " |
| 9 | 0.25 mg/kg I.V. |
| 10 | 10 mg/kg I.D. |
| 13 | 1 mg/kg I.V. |
| 15 | 2 mg/kg I.V. |

Derivatives of general formula (I) are particularly applicable:

In Raynaud's disease, as viso-dilators at the level of the lower limbs, because of their adrenolytic properties.

In paroxysmic hypertension attacks, because of their hypotensive properties.

In cardiovascular and neurological conditions requiring the starting up of a disconnection process and the alleviation of pain.

A few examples of pharmaceutical formulations of derivatives (I) which, generally, include 5–200 mg active ingredient per unit dose of 0.10 to 15 g are given below.

EXAMPLE 18

Tablets containing:

| Product from example 1 | 0.10 g |
|---|---|
| Starch, STA Rx 1500 | 0.150 g |

EXAMPLE 19

Drinkable drops, containing:

| Product from example 1 (as the hydrochloride) | 0.05 g |
|---|---|
| Glycerol | 2 cc |
| Distilled water q.s. to make | 10 cc |

EXAMPLE 20

Injectable solution in ampoules containing:

| Product from example 3 (as the hydrochloride) | 0.03 g |
|---|---|
| Physiological saline solution to | 10 cc |

EXAMPLE 21

Suppository containing:

| Product from example 7 | 0.05 g |
|---|---|
| Excipient based on hydrogenated fatty acid esters, q.s. to make | 1 suppository |

It is apparent from the above that the derivatives according to the invention are therapeutically useful by any of the usual routes of administration. Depending on the product, 20 to 1000 mg of active ingredient, optionally combined with a convenient vehicle for the route of administration selected, will be administered per 24 hours. It is to be noted that the acid addition salts of the derivatives according to the invention are very simply obtained, by dissolution of the derivatives in an acid, for example in one equivalent of hydrochloric acid, and that they are soluble. Therefore, the drug may readily be administered in liquid form.

Having now described my invention what I claim as new and desire to secure by Letters Patent is:

1. A compound selected from A) 5-(piperidine-4-spiro)-oxazolidin-2-one derivatives of formula:

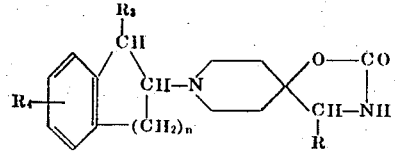

in which R is selected from the group consisting of hydrogen, the lower alkyl radicals and phenyl, $n$ is an integer selected from 1 and 2, $R_3$ is selected from the group consisting of hydrogen and the lower alkyl radicals and $R_4$ is selected from the group consisting of hydrogen, chlorine, bromine, fluorine, the lower alkoxy radicals and the hydroxy radical, and B) their acid addition salts.

2. 5-(1,2,3,4-tetrahydro-naphthalene-2:1-piperidine-4-spiro)-4-phenyl oxazolidin-2-one and its acid addition salts.

3. 5-(2,3-dihydro-indene-2:1-piperidine-4-spiro)-4-ethyl-oxazolidin-2-one and its acid addition salts.

4. 5-(1,2,3,4-tetrahydro-naphthalene-2:1-piperidine-4-spiro)-4-methyl-oxazolidin-2-one and its acid addition salts.

5. 5-(5-methoxy-1,2,3,4-tetrahydro-naphthalene-2:1-piperidine-4-spiro)-4-ethyl-oxazolidin-2-one and its acid addition salts.

6. 5-(1-n-propyl-1,2,3,4-tetrahydronaphthalene-2:1-piperidine-4-spiro)-4-ethyl-oxazolidin-2-one and its acid addition salts.

7. A compound as claimed in claim 1, wherein $n$ is 2.

8. A compound as claimed in claim 1, wherein $R_4$ is chlorine.

9. 5-(1,2,3,4-Tetrahydro-naphthalene-2:1-piperidine-4-spiro)-4-ethyl-oxazolidin-2-one and its acid addition salts.

10. 5-(1,2,3,4-Tetrahydro-naphthalene-2:1-piperidine-4-spiro)-oxazolidin-2-one and its acid addition salts.

11. 5-(7-methoxy-1,2,3,4-tetrahydro-naphthalene-2:1-piperidine-4-spiro)-4-ethyl-oxazolidin-2-one and its acid addition salts.

12. 5-(6-Chloro-1,2,3,4-tetrahydro-naphthalene-2:1-piperidine-4-spiro)-4-ethyl-oxazolidin-2-one and its acid addition salts.

* * * * *